United States Patent [19]

Smith

[11] Patent Number: 5,433,067

[45] Date of Patent: Jul. 18, 1995

[54] CONTROL MECHANISM FOR ROUND BALER NET CUTTING APPARATUS

[75] Inventor: Joseph N. Smith, Lancaster, Pa.

[73] Assignee: New Holland North America, Inc., New Holland, Pa.

[21] Appl. No.: 105,572

[22] Filed: Aug. 13, 1993

[51] Int. Cl.⁶ .................... A01F 15/07; B65B 11/04
[52] U.S. Cl. ....................... 56/341; 53/587; 100/88
[58] Field of Search .............. 56/341, 342, 343; 100/88; 53/587, 118, 389.3, 66

[56] References Cited

U.S. PATENT DOCUMENTS

| | | | |
|---|---|---|---|
| 4,956,968 | 9/1990 | Underhill | 56/341 |
| 4,995,216 | 2/1991 | Vansteelant | 53/389.3 X |
| 5,216,873 | 6/1993 | Ratzlaff et al. | 53/118 X |
| 5,259,167 | 11/1993 | Underhill et al. | 53/587 X |
| 5,289,672 | 3/1994 | Underhill | 53/587 |
| 5,319,899 | 6/1994 | Jennings et al. | 53/587 X |

*Primary Examiner*—Terry Lee Melius
*Attorney, Agent, or Firm*—Frank A. Seemar; Larry W. Miller

[57] ABSTRACT

An agricultural baler for making cylindrical bales of crop material having a sledge assembly moveable between bale starting and full bale positions. The sledge assembly includes a plurality of rollers which cooperate with an apron to define a bale forming chamber. A dispensing mechanism is carried on the sledge assembly for dispensing web material into the bale forming chamber whereupon it is wrapped circumferentially around a cylindrical package of crop material. A net supply assembly is associated with the dispensing mechanism to provide net for feeding into the bale chamber via the dispensing mechanism. Included along the feed path of the net is a net severing assembly for cutting the net after it has been wrapped around the cylindrical hay package. The net severing assembly includes a free falling knife for operatively engaging the net prior to entry into the chamber. A knife constraint system is employed to maintain the knife inoperative in a holding range while permitting it to fall in a release range. A control arrangement trips a latch that controls the knife drop under conditions where the constraint system is in the release range.

7 Claims, 6 Drawing Sheets

CONTROL MECHANISM FOR ROUND BALER NET CUTTING APPARATUS

FIELD OF THE INVENTION

This invention relates generally to round balers and more particularly to an improved knife latch for net cutting apparatus.

BACKGROUND OF THE INVENTION

Prior art round balers generally have a bale forming chamber defined by an array of side-by-side belts, transverse slats trained on chains, a plurality of rolls or a combination of these various elements. Crop material is picked up from the ground and fed into a chamber where it is spirally rolled to form a compact cylindrical hay package. While inside the chamber in its compacted form, the outer surface of the package is wrapped with twine or web material, such as net, to form a bale which is then ejected from the chamber for subsequent handling.

Exemplary of prior art round balers of the general type mentioned above is the baler disclosed in U.S. Pat. No. 4,956,968 issued in the name of K. R. Underhill on Sep. 18, 1990. In this baler a combination of rolls and belts is used for bale formation. The baler also includes a mechanism for supplying net to a dispensing assembly which in turn feeds the net into the bale forming chamber for wrapping a cylindrical package of crop material. The dispensing mechanism includes a net insertion arrangement having a grasping portion for taking net from the supply mechanism and inserting the free edge, commonly referred to as the tail, into the chamber. Subsequent to wrapping, the net material is severed by a cutting device, comprising an assembly that drops a knife in a free falling fashion into the path of the taut net causing a severing action as the bale rotates and pulls the net against the knife edge. After the net is severed, the bale is ejected rearwardly by lifting the tail gate to open the chamber.

In the arrangement noted above, it is important that the free falling knife step be properly coordinated with other functional steps of the baler. This coordination is especially critical because cutting takes place in an area where the dispensing mechanism projects during the time that net is being dispensed into the chamber. Serious damage would result if the cutting and wrapping functions were initiated at the same time due to a simple malfunction of their respective control mechanisms, operator error, etc. In U.S. patent application Ser. No. 07/931,801, filed Aug. 18, 1992 in the name of Kenneth R. Underhill, et al, and assigned to a common assignee, a round baler mechanism is disclosed which deals with this problem. The mechanism controls a latch that will not release a free falling knife assembly until after the wrapping mechanism has been properly sequenced.

Another example of the importance of coordinating various round baler functions is highlighted by the situation where a free falling knife assembly is dropped before the net is properly presented, regardless of whether other mechanisms are in the path of the knife. Among the problems arising in this situation would be a ragged or uneven cut, premature cutting, i.e., before the proper number of wraps are applied, a missed cut due to slack net which leads to the need for manual intervention and a myriad of other problems brought on by the complexities of the sequential steps in the automated balers for which the mechanism is designed.

SUMMARY OF THE INVENTION

An important object of the present invention is to provide a simplified knife latch for a round baler net cutting assembly that overcomes the above problems while still providing a reliable effective mechanism that lends itself to ease of adjustability.

In pursuance of this and other important objects the present invention provides an improvement for a round baler having a net severing assembly including a free falling knife for operatively engaging a web of net by dropping into its path up stream of the point of its entry into a bale wrapping chamber, and a knife constraint for holding the knife in an inoperative position. More particularly, the improvement contemplates a latching means including a latch for preventing the free falling knife from being dropped, trip means operatively coupled to the latching means for releasing the latch to permit the knife to drop, and actuator means coupled to the knife constraint. The actuator is driven in a first direction through a hold range that causes the knife constraint to hold the knife in an inoperative position and a second direction having a release range for releasing the constraint. The trip means is mounted on the actuator and adapted to engage the latching means when the actuator means is driven in both the first and second directions, the actuator being adapted to trip the latching means only when the actuator means is driven in the second direction through the release range.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
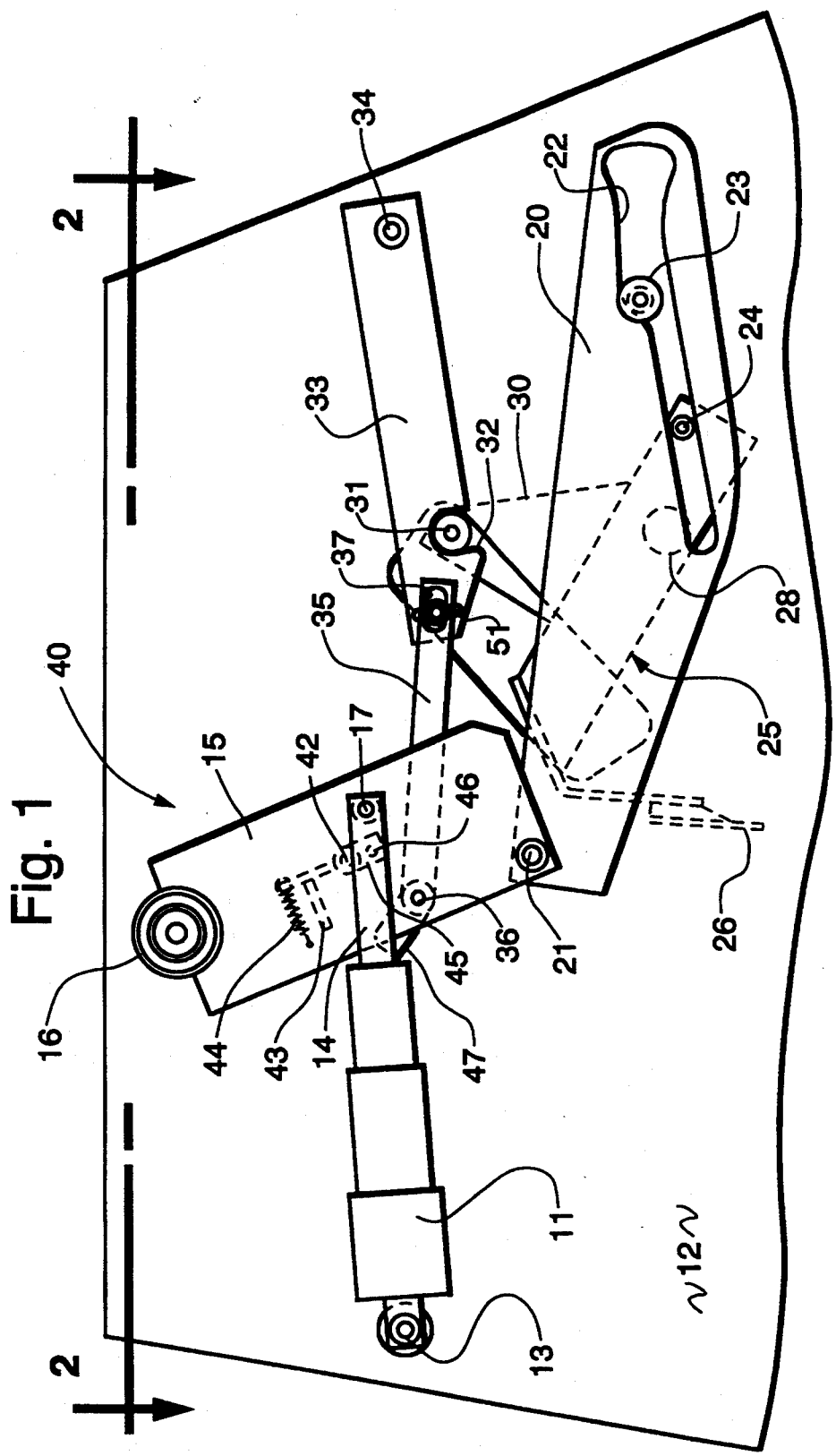
FIG. 1 is a diagrammatic side elevational view showing the control mechanism in which the present invention is embodied.

Referring now to the drawings for a more detailed description of the preferred embodiment of the invention, FIG. 1 shows a control system for a round baler of the type having an expandable chamber defined by belts and rollers, as generally disclosed in abovementioned U.S. Pat. No. 4,956,958 and U.S. patent application Ser. No. 07/931,801, both of which are hereby incorporated by reference. The system includes an actuator 11, mounted on the baler sidewall 12 via a pivotal mounting assembly 13, includes a driven element 14 that is reciprocally driven in a commonly known manner to swing an actuator plate 15 about its pivotal mounting assembly 16, also affixed to sidewall 12. Element 14 is pivotally attached to plate 16 via pin 17 and sleeve 18 (see FIG. 2). A cam arm 20, also pivotally attached to plate 15 via a pivot 21, includes a cam slot 22 through which a support roller 23 extends, as does a knife constraint pin 24 which is operative with cam slot 22 to control the operation of knife assembly 25 in the manner described in the patent application referred to above.

Figure 2:
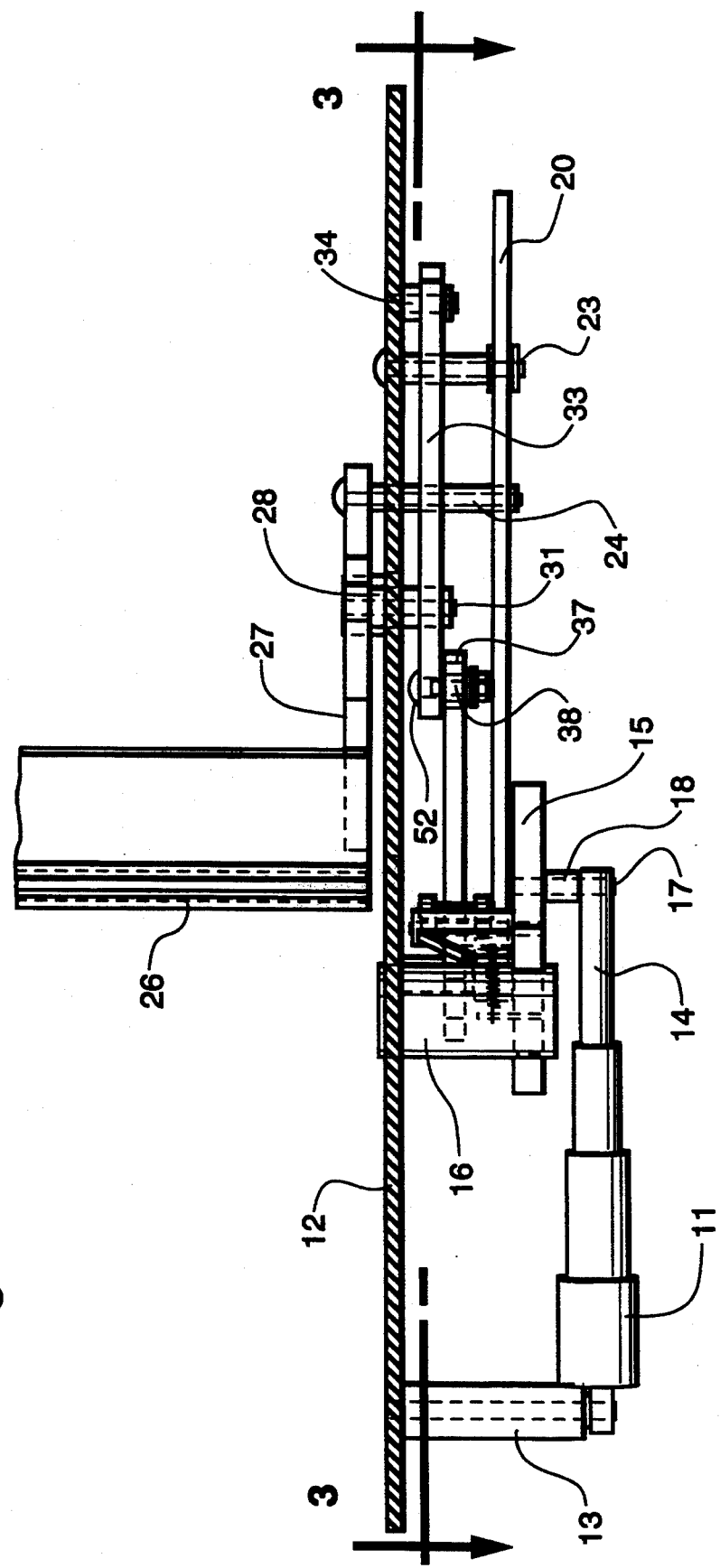
FIG. 2 is a sectional view taken in the direction of arrows 2—2 in FIG. 1.

Knife assembly 25 comprises a knife 26 secured between a pair of knife side plates 27 (only one shown) all of which is pivotally mounted on stub shafts 28 (FIG. 2). Extending from an integral shoulder portion 30 of knife assembly 25 is a latch pin 31 accommodated by a notch 32 in a latch arm 33. Arm 33, pivoted at 34 on side wall 12, has rotatably mounted at the outer end thereof a lift rod 35 which is also pivotally mounted to side wall 12 at a pivot 36. Lift rod 35 is slotted at 37 to provide limited freedom for a pin 38 (FIG. 2), secured to latch arm 33, to move in a horizontal path via slot 37. Thus, when lift rod 35 moves up about pivot 36, latch 33 is free to be translated vertically about pivot 34 due to the sideways freedom afforded by slot 37.

Figure 3:
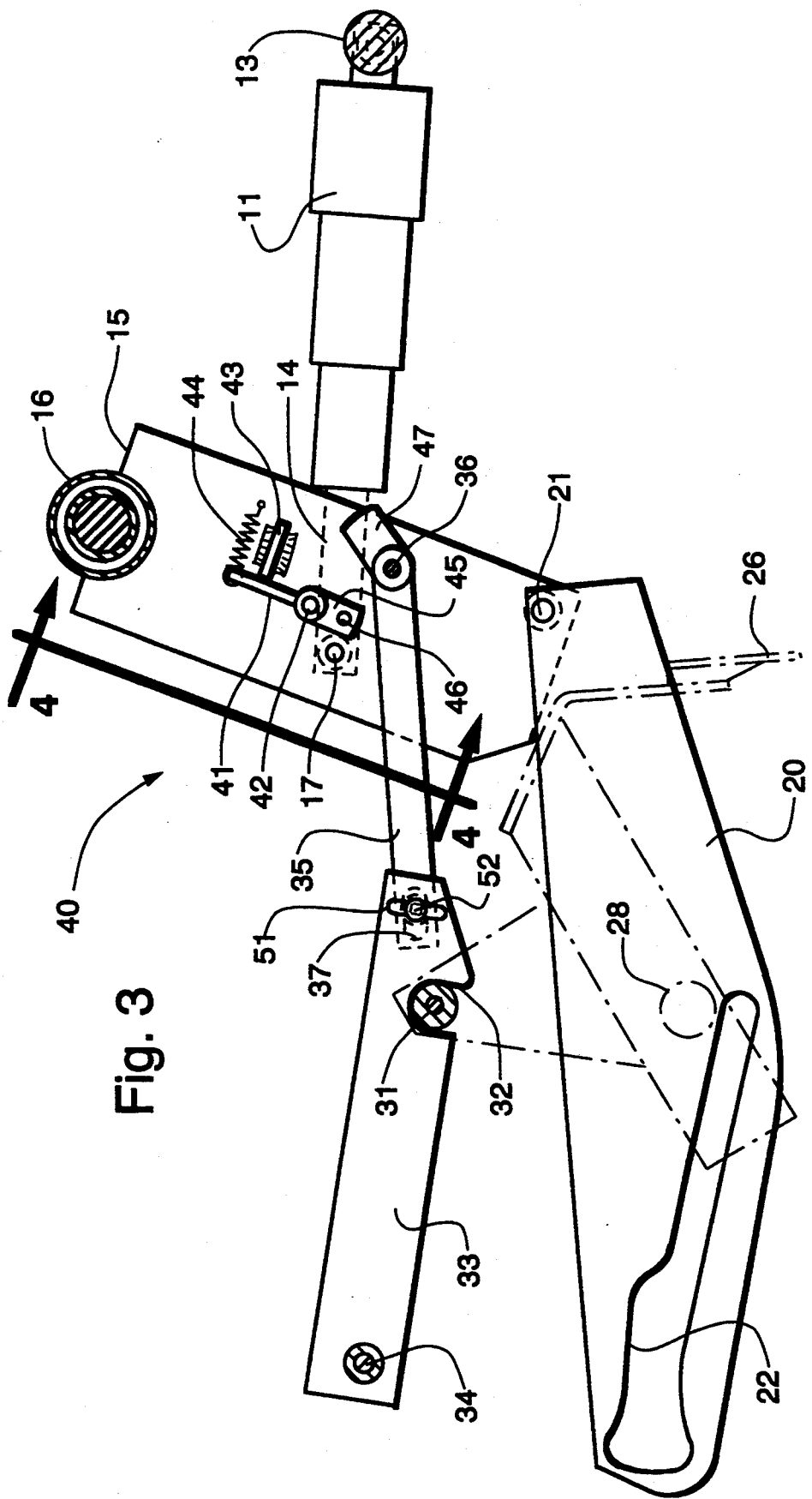
FIG. 3 is a sectional view taken in the direction of arrows 3—3 in FIG. 2.
Figure 4:
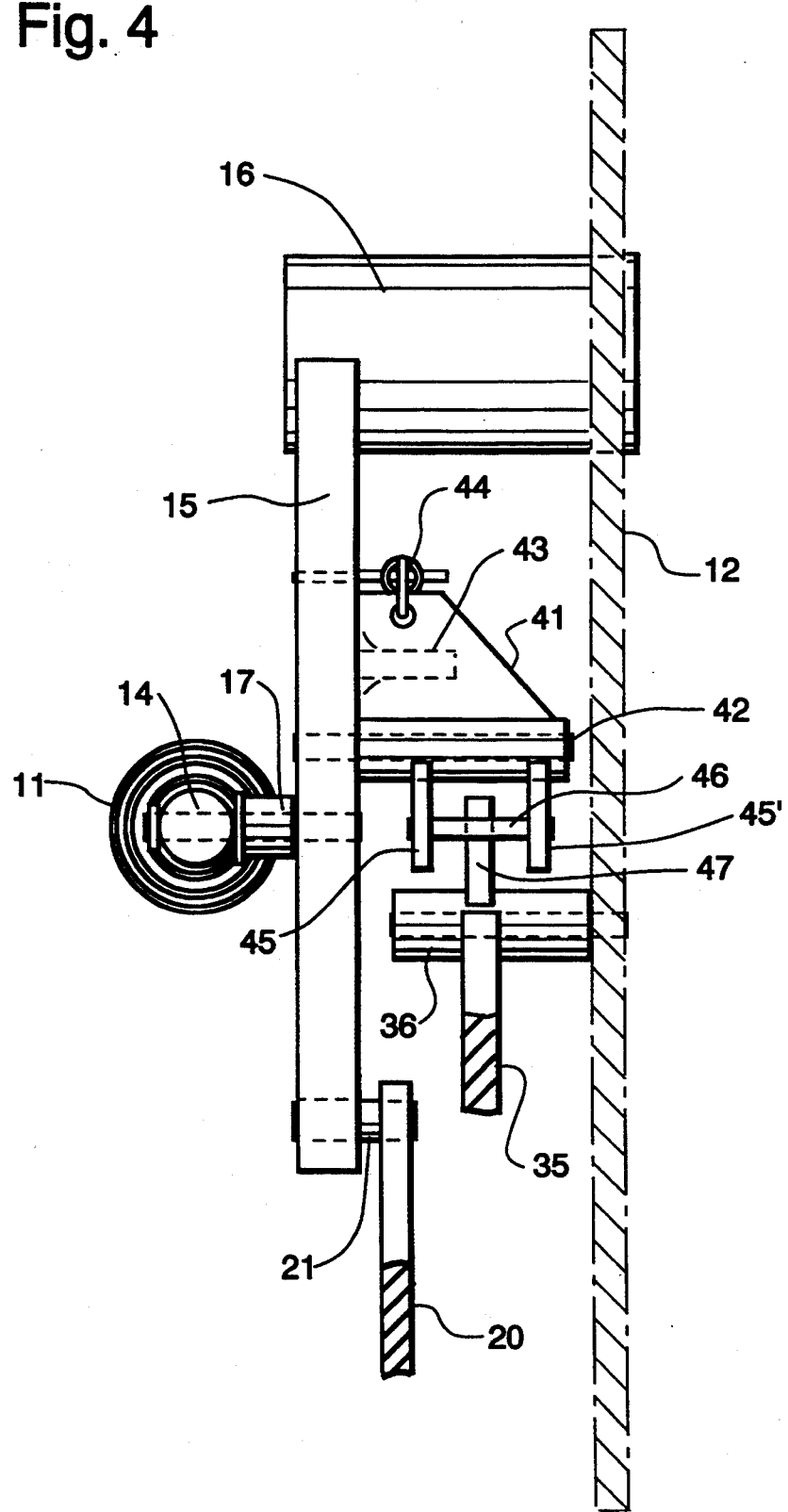
FIG. 4 is a sectional view taken in the direction of arrows 4—4 in FIG. 3.

Turning now to FIGS. 3 and 4, trip assembly 40, mounted on actuator plate 15, is depicted as having an arm 41 pivotally mounted at a pivot 42 and held against a stop 43 by a spring 44. Extending from the other end of arm 41 is a pair of ears 45, 45' between which is mounted a trip rod 46. A lift rod extension arm 47 extends from pivot 36 in the path of trip rod 46 as discussed below.

Figure 5:
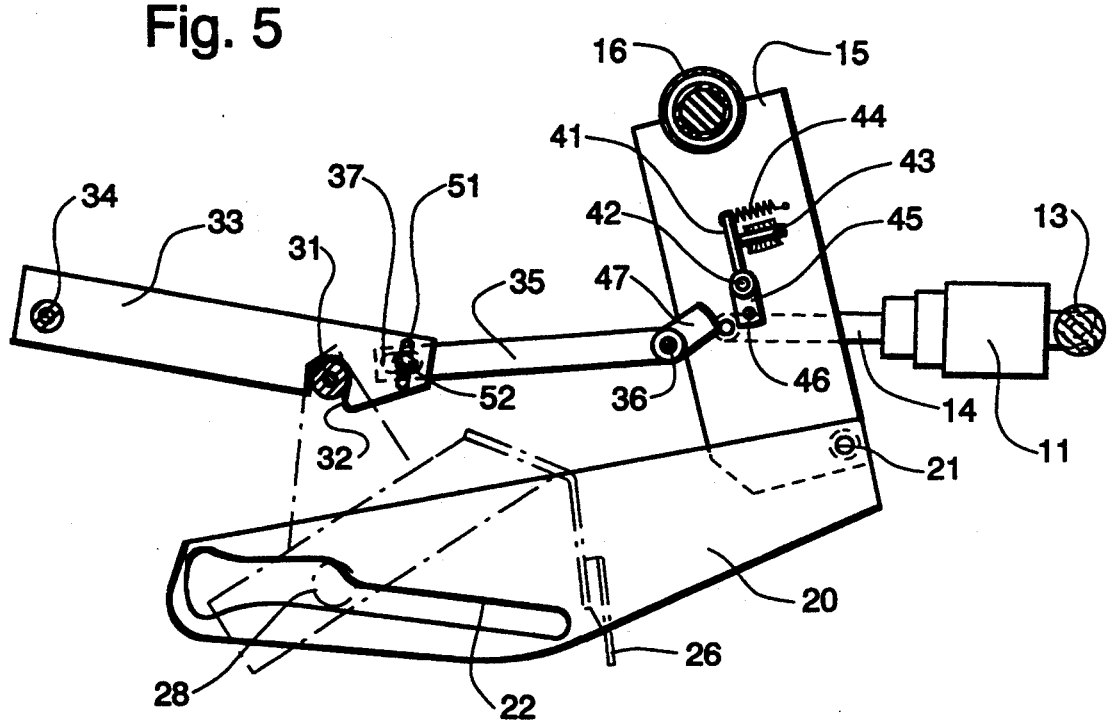
FIGS. 5 through 8 are views similar to FIG. 3 showing various elements of the present invention in a sequence of operational positions.
Figure 6:
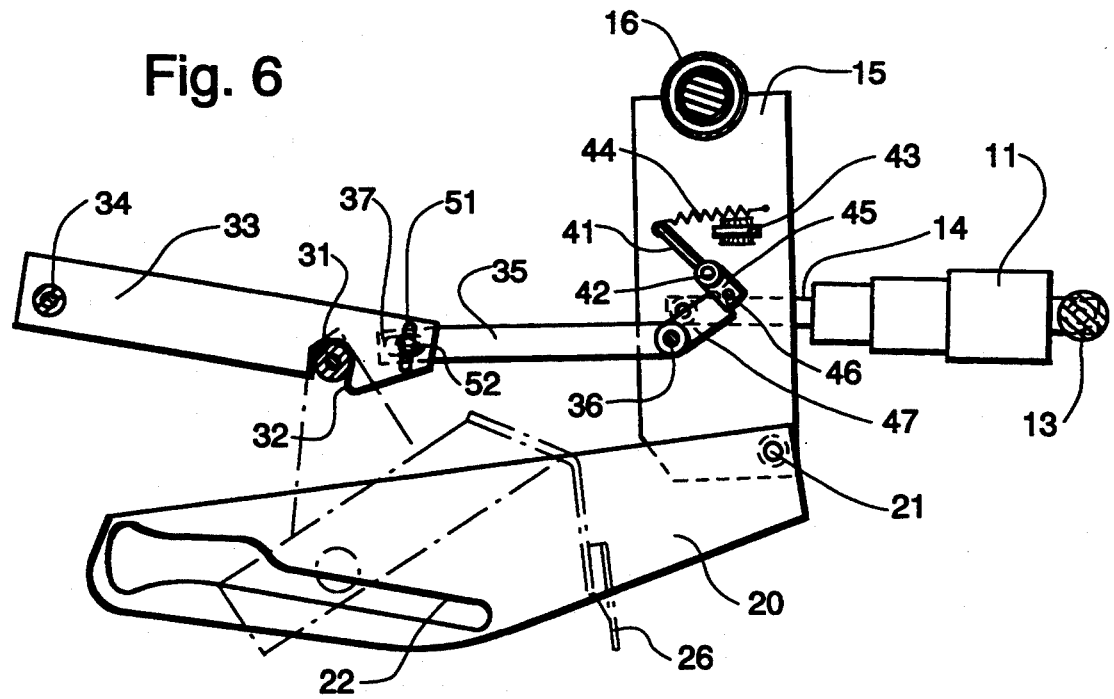
Figure 7:
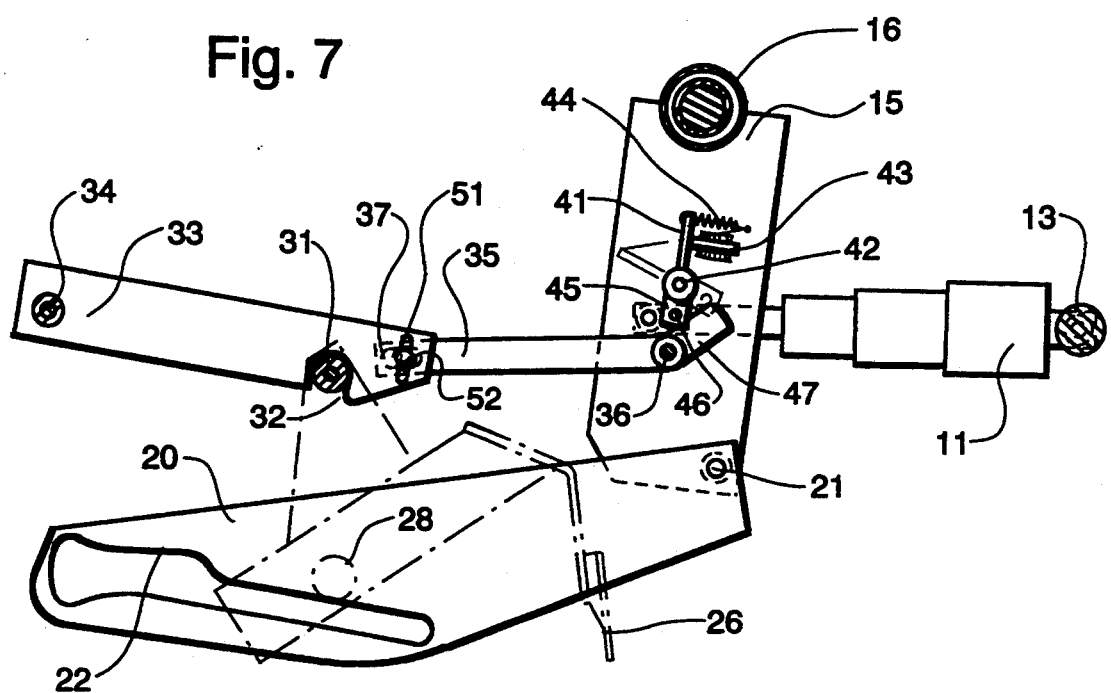
Figure 8:
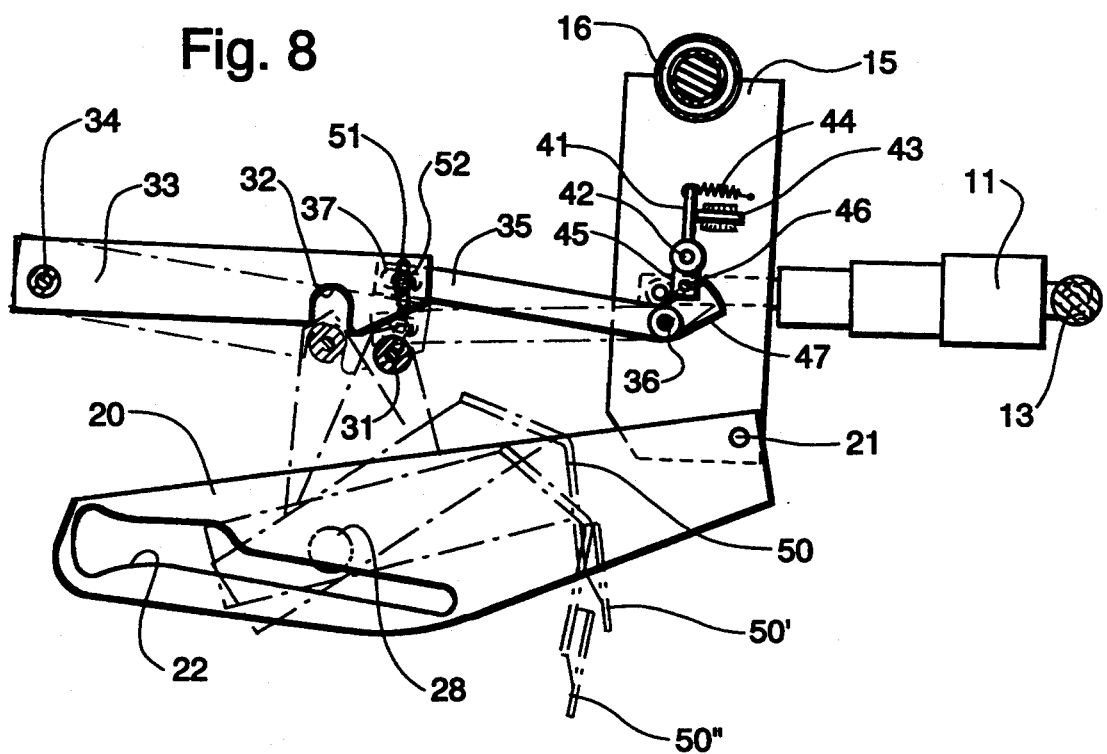

The operation of the present invention is best described by following the sequential steps depicted in FIGS. 3 and 5 through 8. Initially, actuator 11 is fully retracted as shown in FIG. 5. Arm 41 is held against stop 43 by spring 44, notch 32 of latch arm 33 receives latch pin 31 and knife 26 is in the inoperative position and restrained against operation by constraint pin 24 (see FIG. 1) riding in the hold range of cam slot 22 in a manner described in the patent application referred to above, i.e., pin 24 has no vertical freedom while disposed in the narrow portion of slot 22 and thereby constrains pivotal movement of knife assembly 25 about pivot 28.

When actuator 11 becomes energized, plate 15 is pivoted clockwise (when viewed as shown in FIG. 3 and 5 through 8) and cam 20 moves from right to left maintaining pin 24 within the constraints of the hold range of cam slot 22. (Pin 24 is not shown in the diagrammatical illustrations of FIGS. 5 through 8.) Continued pivotal motion of plate 15 moves trip assembly 40 from right to left and thereby causes arm 41 to pivot about pivot 42 against the tension of spring 44, as shown in solid lines in FIG. 6 and in phantom outline in FIG. 7, until trip rod 46 rides over lift rod extension arm 35 as shown in solid lines in FIG. 7.

Actuator plate 15 then continues to pivot and carry trip assembly 40 in a clockwise direction until it reaches the position shown in FIG. 3, whereat latch pin 31 remains in the confines of cam notch 32. At this time wrapping takes place with the knife remaining in the constrained inoperative position until such time as actuator 11 is energized to retract element 14, which moves cam plate 20 back to the right until pin 24 no longer provides a constraint to the gravitational drop action of knife assembly 25, i.e., constraint pin 24 enters the release range of slot 22. Trip assembly 40 also moves back with plate 15 in a counterclockwise direction until it reaches the position shown in FIG. 8 which trips latch arm 33 to the solid position from the phantom position enabling knife 26 to drop from position 50 through intermediate position 50' to severing position 50" in an unimpeded fashion at the precise time that trip rod 46 moves the end of lift rod extension arm 35 past the trip position, i.e., lift rod pivots up in a clockwise direction around pivot 36 which raises integral latch arm 33 from the phantom position to the solid line position shown in FIG. 8.

When the knife is operating in the release range, the precise time in the sequence the knife drops can be adjusted within a window determined by the position at which pin 38 is secured along a vertical path defined by slot 51. Cooperative therewith is horizontal slot 37 in lift rod 35 which slidably receives a collar on pin 38, which collar is held snug against latch arm 33. Vertical slot 51 provides in latch 33 a path along which the precise position of pin 38 and its collar can be located to accurately determine the point in the operation at which trip rod 46 engages lift rod arm 47 and thereby pivots latch 33 away from latch pin 31 on knife assembly 25 to thereby initiate knife drop.

Ultimately the knife assembly is returned to the position shown in FIG. 5 and is poised again for operation at such time as the cutting step is reached in the sequence. More specifically, the returning process involves the counterclockwise rotation of the knife assembly about pivot 28, which moves pin 31 from the solid line position shown in FIG. 8 to the phantom line position shown in FIG. 8, the latter of which corresponds to the solid line position in FIG. 5. This rotational motion is effected by a reset rod, or the like. During such rotation, cam arm 20 is positioned to permit freedom of knife constraint pin 24 (se FIG. 1) to move in cam slot 22.

Included in the many implicit and explicit advantages of the above described apparatus is the ready access to the simple adjustment required to set the knife for precise cutting. Without releasing the knife assembly, pin 38 and the associated collar can be loosened via a bolt 52 (FIG. 2) slid along slot 51 and affixed in any selected vertical location to change the operative point at which pivoting lift rod 35 will release latch pin 31 from the notch in latch 33.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In an round baler having a net severing assembly including a free falling knife for operatively engaging a web of net by dropping into its path up stream of the point of its entry into a bale wrapping chamber, and a knife constraint for holding said knife in an inoperative position, the improvement comprising a latching means including a latch for preventing said free falling knife from being dropped, trip means operatively coupled to said latching means for releasing said latch to permit said knife to drop, and actuator means coupled to said knife constraint, said actuator driven in a first direction through a hold range that causes said knife constraint to hold said knife in said inoperative position and a second direction for releasing said constraint under conditions where said actuator means is driven through a release range, said trip means mounted on said actuator and adapted to engage said latching means when said actuator means is driven in both said first direction and said second direction, said actuator adapted to trip said latching means when said actuator means is driven in said second direction through said release range.

2. A baler as set forth in claim 1 wherein said latching means includes a pivotally mounted lift rod operatively associated with said trip means for engaging said trip means and lifting said latch to permit said knife to drop under conditions where said actuator means is driven in said second direction through said release range.

3. A baler as set forth in claim 2 wherein said actuator means includes a pivotally mounted plate on which said trip means is mounted.

4. A baler as set forth in claim 3 wherein said trip means include pivotally mounting means for pivoting said trip means out of engagement with said rod under condition where said plate is driven in said one direction.

5. A baler as set forth in claim 4 wherein said lift rod is mounted in the path of said trip means under conditions where said actuator means is driven in said first direction, and said pivotally mounting means permits said trip means to engage said rod to pivot said trip means out of engagement therewith.

6. A baler as set forth in claim 3 wherein said actuator means further include a cam arm for coupling said knife constraint to said pivotally mounted plate.

7. A baler as set forth in claim 6 wherein said cam arm includes a cam slot having a hold range and a release range in which said knife constraint is operatively engaged.

* * * * *